US012179490B2

(12) United States Patent
Hayashi

(10) Patent No.: US 12,179,490 B2
(45) Date of Patent: Dec. 31, 2024

(54) RECORDING DEVICE AND RECORDING METHOD

(71) Applicant: SEIKO EPSON CORPORATION, Tokyo (JP)

(72) Inventor: Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 18/169,239

(22) Filed: Feb. 15, 2023

(65) Prior Publication Data

US 2023/0256739 A1 Aug. 17, 2023

(30) Foreign Application Priority Data

Feb. 17, 2022 (JP) ................................ 2022-022702

(51) Int. Cl.
*B41J 2/145* (2006.01)
*B41J 2/21* (2006.01)

(52) U.S. Cl.
CPC ................ *B41J 2/145* (2013.01); *B41J 2/21* (2013.01)

(58) Field of Classification Search
CPC ... B41J 2/145; B41J 2/21; B41J 19/147; B41J 2/04508
See application file for complete search history.

(56) References Cited

U.S. PATENT DOCUMENTS

2014/0210892 A1* 7/2014 Maruyama ................ B41J 2/21 347/14

FOREIGN PATENT DOCUMENTS

JP 2014-195902 A 10/2014

* cited by examiner

*Primary Examiner* — Bradley W Thies
(74) *Attorney, Agent, or Firm* — Global IP Counselors, LLP

(57) ABSTRACT

A recording device includes a vertical array type recording head, and when an image is recorded by performing main scanning a plurality of times, by forward scanning, sub scanning, and return scanning, with a range of first nozzles of a first nozzle group adjacent in a second direction to a second nozzle group corresponding to a first chromatic color having a lowest discharge ratio among a plurality of chromatic liquids as a first range, and a range of first nozzles of the first nozzle group adjacent in a second direction to a second nozzle group corresponding to a chromatic color other than the first chromatic color of the plurality of chromatic colors as a second range, performs first recording control in which a discharge ratio of an achromatic liquid by the first range is made higher than a discharge ratio of the achromatic liquid by any second range.

5 Claims, 7 Drawing Sheets

RECORDING DEVICE AND RECORDING METHOD

The present application is based on, and claims priority from JP Application Serial Number 2022-022702, filed Feb. 17, 2022, the disclosure of which is hereby incorporated by reference herein in its entirety.

BACKGROUND

1. Technical Field

The present disclosure relates to a recording device and a recording method.

2. Related Art

A printing apparatus, and a method are disclosed, that use a vertical array type printing head in which a color ink nozzle row in which a color ink nozzle group of a plurality of colors are aligned in series in a sub scanning direction, and a monochrome nozzle row, are aligned in parallel (see JP-A-2014-195902).

According to JP-A-2014-195902 described above, printing data of a black ink for one band corresponding to a width of a nozzle group of one color ink is divided so as to be printed in ratios of 25%:50%:25% for three scans in a main scanning direction in which a forward pass, a return pass, a forward pass, a return pass, and the like, alternately continue, and the divided print data of the black ink is allocated to each range of the monochrome ink nozzle row corresponding to the nozzle group of each of colors of cyan, magenta, and yellow, and is printed. Thus, while a printing order is inverted between the color ink and the black ink in a printing region for adjacent band units, a total amount of the black ink is generally identical for the forward pass and the return pass. This reduces color inversion unevenness caused by the difference of printing order of the respective color inks.

There has been room for further improvement in order to suppress the color inversion unevenness, when recording is performed using the vertical array type head as described above.

SUMMARY

A recording device includes a recording head including a plurality of nozzle groups in which a plurality of nozzles configured to discharge liquid onto a medium are disposed in a first direction, a transport unit configured to transport the medium, and a control unit configured to control movement of the recording head and discharge of the liquid by the recording head, wherein the recording head includes, as the plurality of nozzle groups, a first nozzle group in which a plurality of first nozzles configured to discharge an achromatic liquid are disposed, and a plurality of second nozzle groups in each of which a plurality of second nozzles configured to discharge a chromatic liquid are disposed, the chromatic liquids being liquids of chromatic colors that are mutually different, the plurality of second nozzle groups are disposed along the first direction, the first nozzle group and the second nozzle group are disposed along a second direction intersecting the first direction, and when, by forward scanning being main scanning in which the recording head is caused to discharge the liquid along with forward movement along the second direction of the recording head, sub scanning being relative movement in the first direction between the recording head and the medium, and return scanning being main scanning in which the recording head is caused to discharge the liquid along with return movement along the second direction of the recording head, an image is recorded by performing the main scanning a plurality of times for a band region in the medium, and when, of the first nozzle group, a range of the first nozzles adjacent in the second direction to a second nozzle group, of the plurality of second nozzle group, corresponding to a first chromatic color having a lowest discharge ratio for recording the image among a plurality of the chromatic liquids is a first range, and of the first nozzle group, a range of the first nozzles adjacent in the second direction to a second nozzle group, of the plurality of second nozzle groups, corresponding to a chromatic color other than the first chromatic color of a plurality of the chromatic colors is a second range, performs first recording control in which a discharge ratio of the achromatic liquid by the first range for recording the image is made higher than a discharge ratio of the achromatic liquid by any second range for recording the image.

In a recording method by a recording device, the recording device including a recording head including a plurality of nozzle groups in which a plurality of nozzles configured to discharge liquid onto a medium are disposed in a first direction and a transport unit configured to transport the medium, the recording head including, as the plurality of nozzle groups, a first nozzle group in which a plurality of first nozzles configured to discharge an achromatic liquid are disposed, and a plurality of second nozzle groups in each of which a plurality of second nozzles configured to discharge a chromatic liquid are disposed, the chromatic liquids being liquids of chromatic colors that are mutually different, the plurality of second nozzle groups being disposed along the first direction, the first nozzle group and the second nozzle group being disposed along a second direction intersecting the first direction, the recording method includes a recording step for performing recording by controlling movement of the recording head and discharge of the liquid by the recording head, wherein in the recording step, when, by forward scanning being main scanning in which the recording head is caused to discharge the liquid along with forward movement along the second direction of the recording head, sub scanning being relative movement in the first direction between the recording head and the medium, and return scanning being main scanning in which the recording head is caused to discharge the liquid along with return movement along the second direction of the recording head, an image is recorded by performing the main scanning a plurality of times for a band region in the medium, and when, of the first nozzle group, a range of the first nozzles adjacent in the second direction to a second nozzle group, of the plurality of second nozzle groups, corresponding to a first chromatic color having a lowest discharge ratio for recording the image among a plurality of the chromatic liquids is a first range, and of the first nozzle group, a range of the first nozzles adjacent in the second direction to a second nozzle group, of the plurality of second nozzle groups, corresponding to a chromatic color other than the first chromatic color of a plurality of the chromatic colors is a second range, a discharge ratio of the achromatic liquid by the first range for recording the image is made higher than a discharge ratio of the achromatic liquid by any second range for recording the image.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes and light and shade may not be precise, match each other, or some may be omitted.

1. Brief Description of Device Configuration

Figure 1:
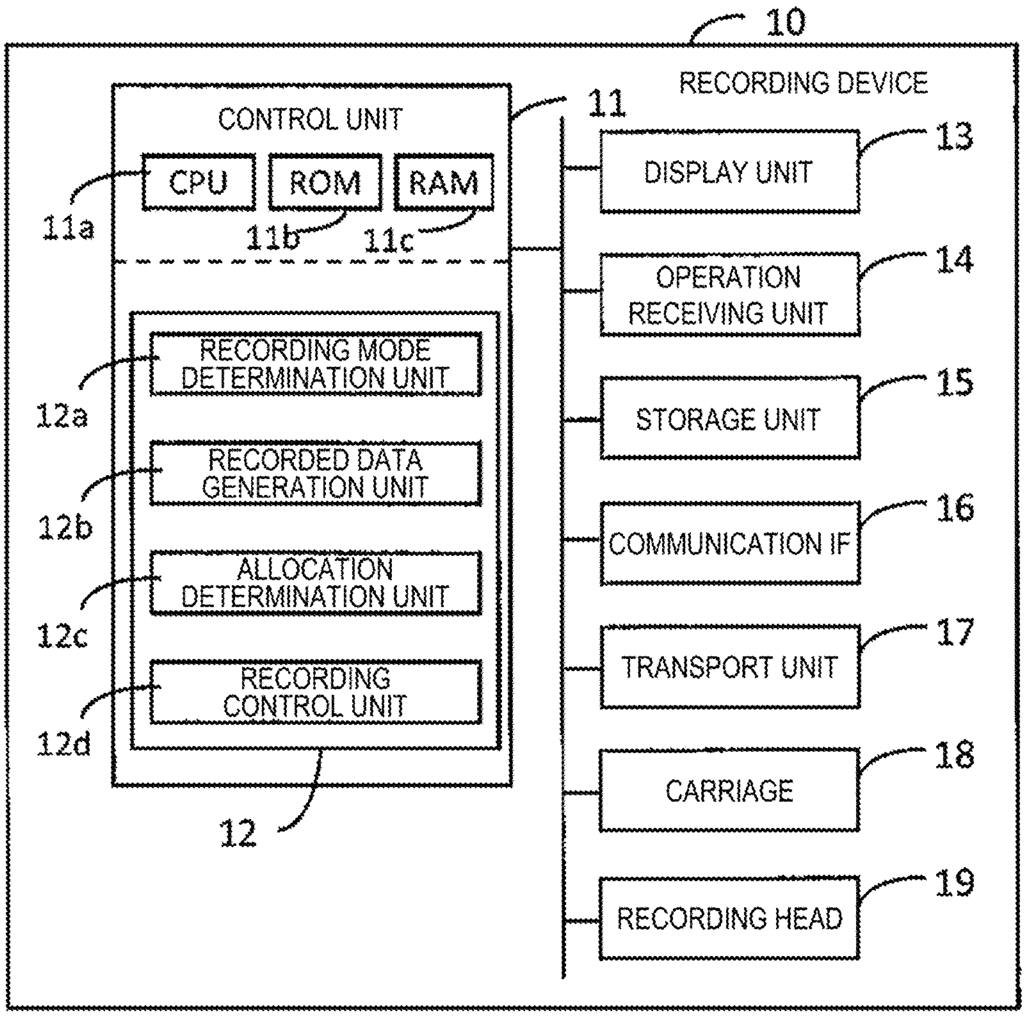
FIG. 1 is a block diagram illustrating a device configuration of the present exemplary embodiment in a simplified manner.

FIG. 1 illustrates a configuration of a recording device 10 according to the present exemplary embodiment, in a simplified manner. A recording method of the present exemplary embodiment is performed by the recording device 10.

The recording device 10 is provided with a control unit 11, a display unit 13, an operation receiving unit 14, a storage unit 15, a communication IF 16, a transport unit 17, a carriage 18, a recording head 19, and the like. IF is an abbreviation for interface. The control unit 11 is configured to include, as a processor, one or more ICs including a CPU 11*a*, a ROM 11*b*, a RAM 11*c*, and the like, another non-volatile memory, and the like.

In the control unit 11, the processor, that is, the CPU 11*a* executes arithmetic processing in accordance with a program 12 stored in the ROM 11*b*, the other memory, or the like, using the RAM 11*c* or the like as a work area, to realize various functions such as a recording mode determination unit 12*a*, a recorded data generation unit 12*b*, an allocation determination unit 12*c*, and a recording control unit 12*d*. The processor is not limited to a single CPU, and a configuration may be adopted in which the processing is performed by a hardware circuit such as a plurality of CPUs, an ASIC, or the like, or a configuration may be adopted in which a CPU and a hardware circuit work in concert to perform the processing.

The display unit 13 is a unit that displays visual information, and is configured, for example, by a liquid crystal display, an organic EL display, or the like. The display unit 13 may be configured to include a display and a drive circuit for driving the display. The operation receiving unit 14 is a unit that receives input by a user, and is realized, for example, by a physical button, a touch panel, a mouse, a keyboard, or the like. Of course, the touch panel may be realized as a function of the display unit 13. The display unit 13 and the operation receiving unit 14 may be referred to as an operation panel of the recording device 10. The display unit 13 and the operation receiving unit 14 may be a part of the configuration of the recording device 10, or may be peripheral devices externally coupled to the recording device 10.

The storage unit 15 is, for example, a hard disk drive, a solid-state drive, or a storage unit by any other memory. A part of the memory included in the control unit 11 may be grasped as the storage unit 15. The storage unit 15 may be regarded as a part of the control unit 11.

The communication IF 16 is a generic term for one or a plurality of IFs for performing communication by the recording device 10 with an external device in a wired or wireless manner, in accordance with a prescribed communication protocol including a known communication standard. The external device may be, for example, a communication device such as a personal computer, a server, a smart phone, a tablet type terminal, or the like.

The transport unit 17 is a unit that transports a medium 30 along a predetermined transport direction under control of the control unit 11. The transport unit 17 includes, for example, a roller that rotates and transports the medium 30, a motor as a power source of rotation, and the like. Furthermore, the transport unit 17 may be a mechanism in which the medium 30 is mounted on a belt or a pallet moving by a motor, for transporting the medium 30. The medium 30 is a sheet, for example, but it is sufficient that the medium 30 is a medium that can be a target of recording by liquid, or may be a material other than paper such as film or fabric.

The carriage 18 is a moving unit that performs a reciprocating movement along a predetermined main scanning direction by power of a carriage motor (not illustrated) under the control of the control unit 11. The main scanning direction and the transport direction intersect each other. The carriage 18 is mounted with the recording head 19.

The recording head 19 is a unit that performs recording by discharging liquid onto the medium 30 by an ink-jet method under the control of the control unit 11. Although the liquid is mainly ink, the recording head 19 can discharge liquid other than the ink.

The configuration of the recording device 10 may be realized by a single printer, or may be realized by a system including a plurality of communicatively coupled devices. For example, the recording device 10 may be a system including an information processing device responsible for a role of the control unit 11, and a printer that includes the transport unit 17, the carriage 18, and the recording head 19, and performs recording under control by the information processing device. In this case, the information processing device can be grasped as a recording control device, an image processing device, or the like.

2. Description of Recording Head

Figure 2:
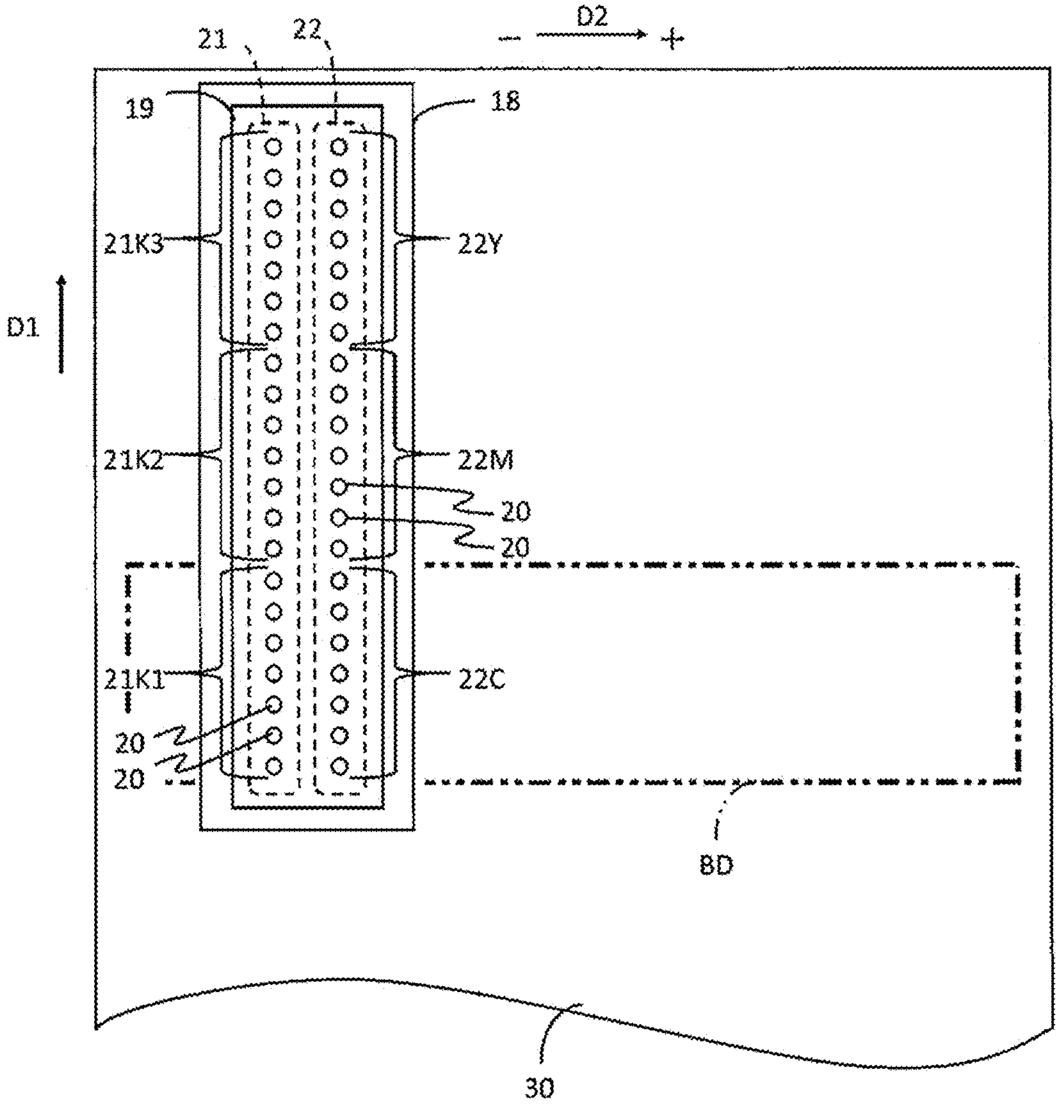
FIG. 2 is a view illustrating a relationship among a medium, a recording head, and the like, as seen from above in a simplified manner.

FIG. 2 illustrates a relationship among the medium 30, the recording head 19, and the like in a simplified manner, as seen from above. The recording head 19 mounted at the carriage 18 can perform forward movement and return movement along with the carriage 18 along a main scanning direction D2. That is, the movement of the carriage 18 and the movement of the recording head 19 are synonymous. The carriage 18 and the recording head 19 need not be distinguished, and may be collectively understood as the recording head 19. For convenience, movement from a negative side to a positive side in the main scanning direction D2 by the carriage 18 is referred to as "forward movement", and movement from the positive side to the negative side in the main scanning direction D2 is referred to as "return movement".

The recording head 19 includes a plurality of nozzles 20 for discharging liquid such as ink. Each of white circles illustrated in FIG. 2 is the individual nozzle 20. Droplets discharged from the nozzle 20 are referred to as dots. The recording head 19 includes a nozzle group per type of liquid. The recording head 19 is capable of discharging a plurality of color inks, such as cyan (C), magenta (M), yellow (Y), and black (K), for example. The recording head 19 may be referred to as a liquid discharging head, a printing head, a typing head, an ink jet head, or the like.

As illustrated in FIG. 2, the nozzle groups are generally divided into an achromatic nozzle group 21 and a chromatic nozzle group 22. The chromatic nozzle group 22 is configured by a plurality of nozzle groups 22C, 22M, and 22Y corresponding to different chromatic liquids being disposed along a transport direction D1. In the perspective of having such a chromatic nozzle group 22, it can be said that the recording head 19 is one of vertical array type heads. A nozzle group corresponding to an ink of one color is configured by disposing the plurality of nozzles 20 for which nozzle pitches, which are intervals between the nozzles 20 in the transport direction D1, are constant or substantially constant. The transport direction D1 and the main scanning direction D2 are orthogonal or substantially orthogonal to each other. In the example illustrated in FIG. 2, the transport direction D1 corresponds to a "first direction", and the main scanning direction D2 corresponds to a "second direction".

The achromatic nozzle group 21 is a nozzle group including a plurality of the nozzles 20 that discharge a K ink, and corresponds to a "first nozzle group". Each nozzle 20 constituting the achromatic nozzle group 21 corresponds to a "first nozzle". In addition to the K ink, a gray ink, a light black ink, or the like is assumed for the achromatic liquid that can be discharged by the recording head 19.

The nozzle group 22C is a nozzle group including a plurality of the nozzles 20 that discharge a C ink. Similarly, the nozzle group 22M is a nozzle group including a plurality of the nozzles 20 that discharge an M ink, and the nozzle group 22Y is a nozzle group including a plurality of the nozzles 20 that discharge a Y ink. Each of the nozzle groups 22C, 22M, and 22Y in the chromatic nozzle group 22 corresponds to a "second nozzle group", and each nozzle 20 constituting each of the nozzle groups 22C, 22M, and 22Y corresponds to a "second nozzle". Note that the chromatic liquid that can be discharged by the recording head 19 is not limited to the three colors of CMY, or may be two colors or more than four colors.

According to FIG. 2, a direction in which the nozzles 20 constituting a common nozzle group are aligned (hereinafter, a nozzle alignment direction) is parallel to the first direction, that is, the transport direction D1. However, as a configuration of the recording head 19, the nozzle alignment direction may obliquely intersect the first direction. Even when the nozzle alignment direction obliquely intersects the first direction, as far as the nozzle pitches of the nozzles 20 in the first direction are constant or substantially constant, the plurality of nozzles 20 are considered to be disposed in the first direction. In FIG. 2, each of the nozzle groups 21, 22C, 22M, and 22Y is one nozzle row in which the nozzles 20 are aligned in a straight line, but off course, each of the nozzle groups 21, 22C, 22M, and 22Y may be constituted by a plurality of nozzle rows.

The transport unit 17 transports the medium 30 from upstream to downstream in the transport direction D1. Upstream and downstream in the transport direction D1 are simply referred to as upstream and downstream. The achromatic nozzle group 21 and the chromatic nozzle group 22 included in the recording head 19 are aligned along the main scanning direction D2, and positions thereof are identical in the transport direction D1. Further, it may be understood that the achromatic nozzle group 21 and the chromatic nozzle group 22 have the same length in the transport direction D1, and the nozzle groups 22C, 22M, and 22Y in the chromatic nozzle group 22 have the same length in the transport direction D1.

The length in the transport direction D1 of each of the nozzle groups 22C, 22M, and 22Y is also referred to as a "band width". In FIG. 2, of the achromatic nozzle group 21, a range of the nozzles 20 adjacent in the main scanning direction D2 to the nozzle group 22C is indicated by a reference sign 21K1. A range of some of the nozzles 20 in a nozzle group is referred to simply as a range, or is referred to as a nozzle range. Similarly, of the achromatic nozzle group 21, a range of the nozzles 20 adjacent in the main scanning direction D2 to the nozzle group 22M is denoted by a reference sign 21K2, and of the achromatic nozzle group 21, a range of the nozzles 20 adjacent in the main scanning direction D2 to the nozzle group 22Y is indicated by a reference sign 21K3. A range adjacent in the main scanning direction D2 means a range where positions in the transport direction D1 are common. Accordingly, a length in the transport direction D1 of each of the nozzle ranges 21K1, 21K2, and 21K3 in the achromatic nozzle group 21 also corresponds to a band width.

The control unit 11 causes the recording head 19 to discharge liquid onto the medium 30 based on recorded data representing an image. As is known, in the recording head 19, a drive element is provided for each nozzle 20, and application of a drive signal to the drive element of each nozzle 20 in accordance with the recorded data is controlled, and thus, the image represented by the recorded data is recorded on the medium 30 by each nozzle 20 discharging dots, or not discharging dots.

The liquid discharge by the recording head 19 along with movement along the main scanning direction D2 of the carriage 18 is referred to as "main scanning", or referred to as a "pass". Main scanning by forward movement of the carriage 18 is referred to as "forward scanning", and main scanning by return movement of the carriage 18 is referred to as "return scanning". Recording performed both in forward scanning and return scanning is referred to as a bi-directional recording. Further, relative movement in the first direction between the recording head 19 and the medium 30 is referred to as "sub scanning". In the configuration illustrated in FIG. 2, the transport unit 17 transports the medium 30 in the transport direction D1 to perform the sub scanning.

The control unit 11 records, on the medium 30, an image represented by recorded data by such forward scanning, sub scanning, and return scanning. A so-called paper feed, which is sub scanning performed once between main scanning and main scanning, is transport by a distance corresponding to a band width. According to FIG. 2, the control unit 11 can complete recording by the CMYK inks by performing main scanning three times, and a paper feed between the main scanning and main scanning, for a "band region", which is a region for one band width in the medium 30. In FIG. 2, one band region BD is indicated by surrounding by a two-dot chain line. However, it is an example to complete recording by performing main scanning three times for one band region, and for example, recording on a band region may be completed by performing main scanning six times in total, in which the main scanning is performed twice for a recording of one chromatic color.

3. Recording Control Processing

Figure 3:
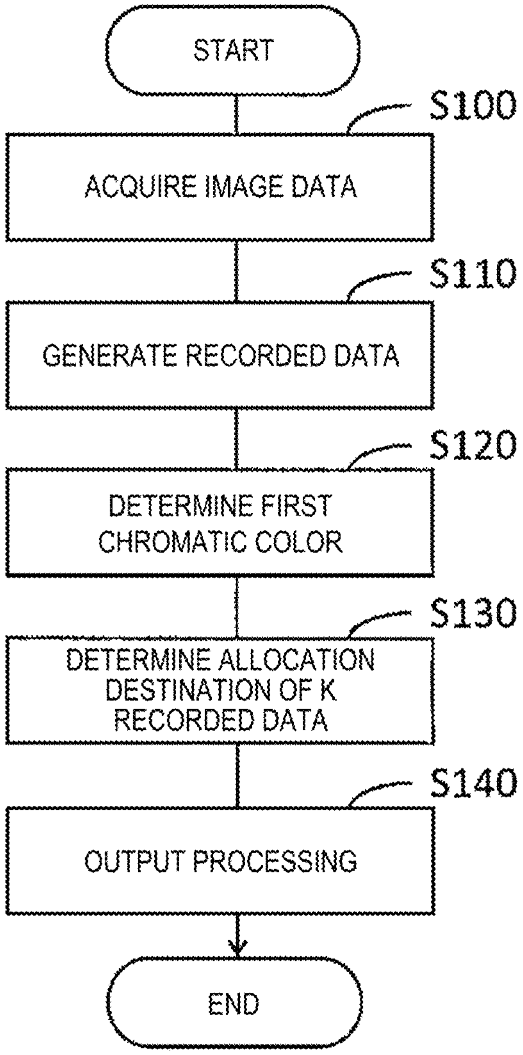
FIG. 3 is a flowchart illustrating recording control processing.

FIG. 3 illustrates, using a flowchart, recording control processing performed by the control unit 11 in accordance with the program 12. The flowchart represents a recording method according to the present exemplary embodiment.

In step S100, the recorded data generation unit 12*b* of the control unit 11 acquires image data representing an image to be recorded. The recorded data generation unit 12*b* acquires image data designated through an operation of the operation receiving unit 14 by a user, for example, from an image data storage location such as the storage unit 15 or a memory inside or outside the recording device 10. Alternatively, the recorded data generation unit 12*b* receives and acquires, via the communication IF 16, image data transmitted from an external device.

In step S110, the recorded data generation unit 12*b* generates recorded data for use in recording of an image by the recording head 19 by performing various types of processing such as resolution conversion processing, color conversion processing, and halftone processing for the image data acquired in step S100. For example, by the color conversion processing, a value for each pixel constituting the image data is converted to a gray scale value representing an amount of ink for each of the CMYK inks used by the recording head 19. Although a color system adopted in the image data is not particularly limited, for example, when the image data is RGB image data having gray scale values of red (R), green (G), and blue (B) for each pixel, the recorded data generation unit 12*b* converts the gray scale value of each of RGB for each pixel of the image data to a gray scale value of each of CMYK with reference to a look-up table defining a conversion relationship between RGB and CMYK. The gray scale value is, for example, expressed in 256 gray scales from 0 to 255.

The recorded data generation unit 12*b* converts a gray scale value of each of CMYK included in the image data for each pixel after the color conversion, to a value representing dot-on or dot-off for each of the CMYK inks, by the halftone processing using a dither method, an error diffusion method, or the like. Dot-on means discharge of a dot, and dot-off means non-discharge of a dot. As a result, the recorded data is generated that defines dot-on or dot-off of each of the CMYK inks for each pixel.

In step S120, the allocation determination unit 12*c* determines a "first chromatic color" having a lowest discharge ratio for recording an image among a plurality of chromatic liquids, based on the recorded data generated in step S110. The discharge ratio is an amount of liquid discharged per constant area, and may be referred to as a recording rate, or may be referred to as a duty. The allocation determination unit 12*c* determines the first chromatic color for each band image. The band image is an image of a size recorded in one band region in an image for one page represented by the recorded data. Since the size of the band image is known, it is sufficient that the allocation determination unit 12*c* divides the image represented by the recorded data into a plurality of band images, and determines a first chromatic color for each band image.

A method for determining a first chromatic color for one band image will be described. The allocation determination unit 12*c* calculates a ratio of the number of pixels that define dot-on for the number of pixels constituting a band image for each of CMY, and sets the ratio to a discharge ratio for each chromatic color in the band image. For example, when the C ink is dot-on in pixels half the number of pixels constituting the band image, a discharge ratio of C in this band image is 50%. The allocation determination unit 12*c* determines a color having a lowest discharge ratio calculated in this manner of CMY to a first chromatic color of the band image.

The discharge ratio for each chromatic color in the band image may be calculated based on the recorded data before the halftone processing. Specifically, the allocation determination unit 12*c* may set a ratio of a sum of the gray scale values of one chromatic color of respective pixels of the band image to a value obtained by multiplying the number of pixels constituting the band image by a maximum gray scale value of 255 to a discharge ratio of the one chromatic color, to calculate a discharge ratio in the same manner for each chromatic color. In this way, the first chromatic color is determined for each band image, but in the image represented by the recorded data, as long as the plurality of adjacent band images have the same tone, the first chromatic color determined for each of these plurality of band images is also the same color.

In step S130, the allocation determination unit 12*c* determines a range in the achromatic nozzle group 21, that is used as an allocation destination of a plate to define dot-on or dot-off of the K ink (hereinafter, K recorded data) for each pixel among CMYK plates that constitute the recorded data generated in step S110, in accordance with the first chromatic color. The determination by step S130 is also performed for each band image. Specifically, the allocation determination unit 12*c* determines an allocation destination of the K recorded data of the band image to, of the achromatic nozzle group 21, a range of the nozzles 20 adjacent in the main scanning direction D2 to a second nozzle group corresponding to the first chromatic color of the band image. The range in the achromatic nozzle group 21 determined in step S130 is also referred to as a "first range". In addition, a range other than the first range in the achromatic nozzle group 21 corresponds to a "second range".

For example, the first chromatic color of a band image is Y. According to FIG. 2, of the achromatic nozzle group 21, a range adjacent to the nozzle group 22Y, which is a second nozzle group for discharging the Y ink, is the nozzle range 21K3. Accordingly, an allocation destination of the K recorded data of the band image is determined to be the nozzle range 21K3, and the nozzle range 21K3 corresponds to a first range, and the nozzle ranges 21K1 and 21K2 correspond to second ranges. Similarly, when the first chromatic color of a band image is M, an allocation destination of the K recorded data of the band image is determined to be the nozzle range 21K2 adjacent to the nozzle group 22M, and the other nozzle ranges 21K1 and 21K3 are second ranges.

Of course, even in any band image, an allocation destination of a plate to define dot-on or dot-off of the C ink for each pixel among the CMYK plates constituting the recorded data (C recorded data) is the nozzle group 22C. Similarly, an allocation destination of a plate to define dot-on or dot-off of the M ink for each pixel (M recorded data) is the nozzle group 22M, and an allocation destination of a plate to define a dot-on or dot-off of the Y ink for each pixel (Y recorded data) is the nozzle group 22Y.

In step S140, the recording control unit 12*d* performs output processing of the recorded data. In other words, the recording control unit 12*d* controls the transport unit 17 to perform the transport of the medium 30 as necessary, and transfers the C, M, Y, and K recorded data for each band image toward each nozzle 20 as the allocation destination in accordance with the above-described allocation determination. As a result, for example, in a process in which processing is sequentially performed such as forward scanning, a paper feed, return scanning, a paper feed, forward scanning, and the like, each color dot is discharged from each nozzle 20 onto the medium 30 in accordance with the recorded data, and the image represented by the recorded data is recorded on the medium 30 sequentially in units of the band images.

Such step S140, and steps S120 and S130 for performing step S140 correspond to a "recording step" that controls the movement of the recording head 19 and the discharge of the liquid by the recording head 19 to perform recording. Also, the recording step by steps S120 to S140 is referred to as "first recording control". In other words, the control unit 11 performs the first recording control in which the discharge ratio of the achromatic liquid by the first range for recording the image is made higher than the discharge ratio of the achromatic liquid by any of the second ranges for recording the image. According to the above description, in the first recording control, the control unit 11 limits the first nozzle for discharging the achromatic liquid for recording the image to the first range.

4. Description of Specific Example

Figure 4A:
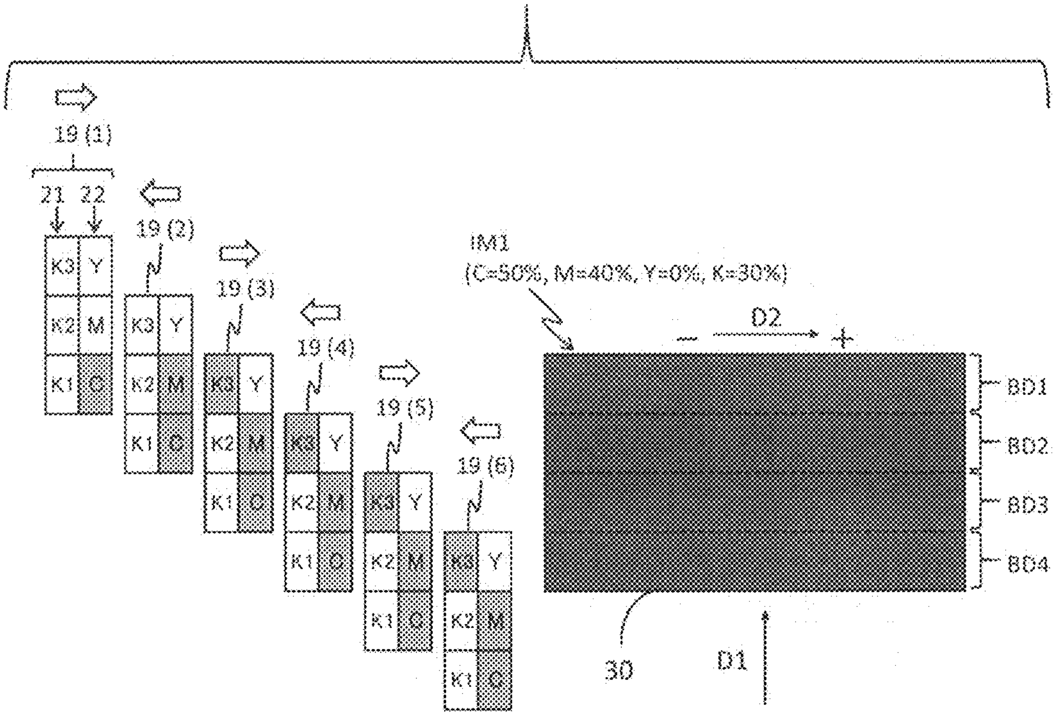
FIGS. 4A and 4B are each a diagram for explaining an example in which an image is recorded on the medium by first recording control.

FIG. 4A is a diagram for explaining how an image IM1 is recorded on the medium 30 based on recorded data by the first recording control, and the recording head 19 and a part of the medium 30 are illustrated. In FIG. 4A, the recording head 19 is simplified as compared to FIG. 2. In FIG. 4A, the carriage 18 and the nozzle 20 are omitted, and, of the achromatic nozzle group 21 in the recording head 19, a rectangle denoted by a reference sign K1 indicates the nozzle range 21K1, and similarly, a rectangle denoted by a reference sign K2 indicates the nozzle range 21K2, and a rectangle denoted by a reference sign K3 indicates the nozzle range 21K3. Additionally, of the chromatic nozzle group 22 in the recording head 19, a rectangle denoted by a reference sign C indicates the nozzle group 22C, a rectangle denoted by a reference sign M indicates the nozzle group 22M, and a rectangle denoted by a reference sign Y indicates the nozzle group 22Y.

Also, each of numbers from 1 to 6 described in parentheses next to the reference sign 19 indicates an order of main scanning, and FIG. 4A illustrates the recording head 19 in scenes where first to sixth main scanning are performed. In addition, a white arrow listed in a vicinity of the reference sign 19 indicates an orientation of the main scanning, and according to FIG. 4A, each of the odd-numbered first, third, and fifth main scanning is forward scanning, and each of the even-numbered second, fourth, and sixth main scanning is return scanning. In FIG. 4A, the recording head 19 seems to move upstream in the transport direction D1 each time the main scanning is performed, but actually, the medium 30 is transported downstream by a band width by a paper feed between the main scanning and the main scanning, and thus a positional relationship between the recording head 19 and the medium 30 in the transport direction D1 is changed.

In FIG. 4A, of the medium 30, four band regions BD1, BD2, BD3, and BD4 aligned along the transport direction D1 are illustrated. The image IM1 is a uniform solid image over a plurality of band images, and discharge ratios of the CMYK inks defined by the recorded data are C=50%, M=40%, Y=0%, and K=30%, respectively. In brief, the image IM1 is a dark blue image. When such an image IM1 is recorded, Y having a lowest discharge ratio among CMY is determined to be a first chromatic color for each band image in step S120, and in step S130 for each band image, the nozzle range 21K3 adjacent to the nozzle group 22Y is determined to be an allocation destination of the K recorded data, that is, a first range. In FIG. 4A, a part of the recording head 19 to be an allocation destination of the recorded data is shaded in gray. Note that, a state of a color with a discharge ratio of 0%, that is, a color for which all pixels are dot-off, is substantially in the same as a state where the recorded data is not allocated to the recording head 19, and thus the color is excluded from a target shaded in gray in the recording head 19.

According to FIG. 4A described above, as the result of step S140, the band region BD1 of the medium 30 is recorded by the discharge of the C ink by the nozzle group 22C of the forward scanning, which is first main scanning, the discharge of the M ink by the nozzle group 22M of the return scanning, which is second main scanning, and the discharge of the K ink by the nozzle range 21K3 of the forward scanning, which is third main scanning. Similarly, the band region BD2 of the medium 30 is recorded by the discharge of the C ink by the nozzle group 22C of the return scanning, which is the second main scanning, the discharge of the M ink by the nozzle group 22M of the forward scanning, which is the third main scanning, and the discharge of the K ink by the nozzle range 21K3 of the return scanning, which is fourth main scanning. In other words, in the example of FIG. 4A, since the discharge of the K ink in accordance with the K recorded data is performed, of the achromatic nozzle group 21, only by each nozzle 20 in the nozzle range 21K3, the color inks are discharged onto the medium 30 in order of C, M, and K, in any of the band regions BD1, BD2, BD3, and BD4. Accordingly, color inversion unevenness caused by a different discharge order of the respective color inks does not occur between the band regions, and high-quality recording results without unevenness are obtained.

Figure 4B:
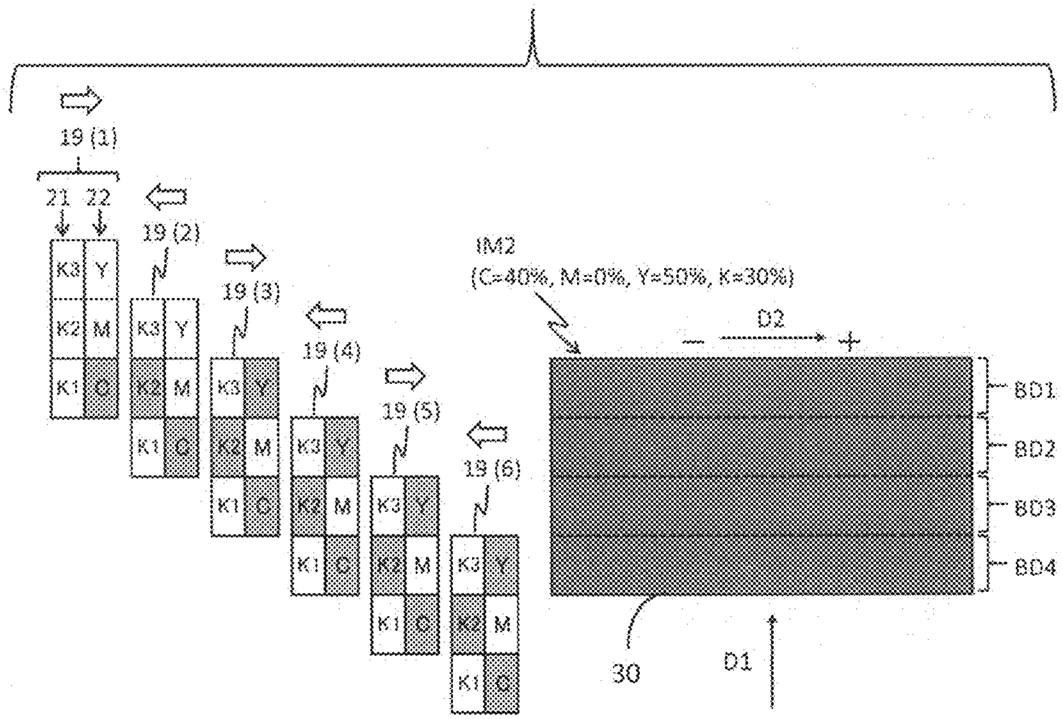

FIG. 4B is a diagram for explaining how an image IM2 is recorded on the medium 30 based on recorded data by the first recording control, and the recording head 19 and a part of the medium 30 are illustrated. A way of looking at FIG. 4B and FIGS. 5A, 5B, and FIG. 7 described later is the same as that of FIG. 4A. Thus, for FIG. 4B, FIG. 5A, FIG. 5B, and FIG. 7, the description of FIG. 4A will be applied as appropriate.

The image IM2 is a uniform solid image over a plurality of band images, and discharge ratios of the CMYK inks defined by the recorded data are C=40%, M=0%, Y=50%, and K=30%, respectively. In brief, the image IM2 is a dark green image. When the image IM2 is recorded, M having a lowest discharge ratio among CMY is determined to be a first chromatic color for each band image in step S120, and in step S130 for each band image, the nozzle range 21K2 adjacent to the nozzle group 22M is determined to be an allocation destination of the K recorded data, that is, a first range.

According to FIG. 4B described above, as the result of step S140, the band region BD1 of the medium 30 is recorded by the discharge of the C ink by the nozzle group 22C of the forward scanning, which is first main scanning, the discharge of the K ink by the nozzle range 21K2 of the return scanning, which is second main scanning, and the discharge of the Y ink by the nozzle group 22Y of the forward scanning, which is third main scanning. Similarly, the band region BD2 of the medium 30 is recorded by the discharge of the C ink by the nozzle group 22C of the return scanning, which is the second main scanning, the discharge of the K ink by the nozzle range 21K2 of the forward scanning, which is the third main scanning, and the discharge of the Y ink by the nozzle group 22Y of the return scanning, which is fourth main scanning. In other words, in the example of FIG. 4B, since the discharge of the K ink in accordance with the K recorded data is performed, of the achromatic nozzle group 21, only by each nozzle 20 in the nozzle range 21K2, the color inks are discharged onto the medium 30 in order of C, K, and K, in any of the band regions BD1, BD2, BD3, and BD4. Accordingly, color inversion unevenness caused by a different discharge order of the respective color inks does not occur between the band regions, and high-quality recording results without unevenness are obtained.

Figure 5A:
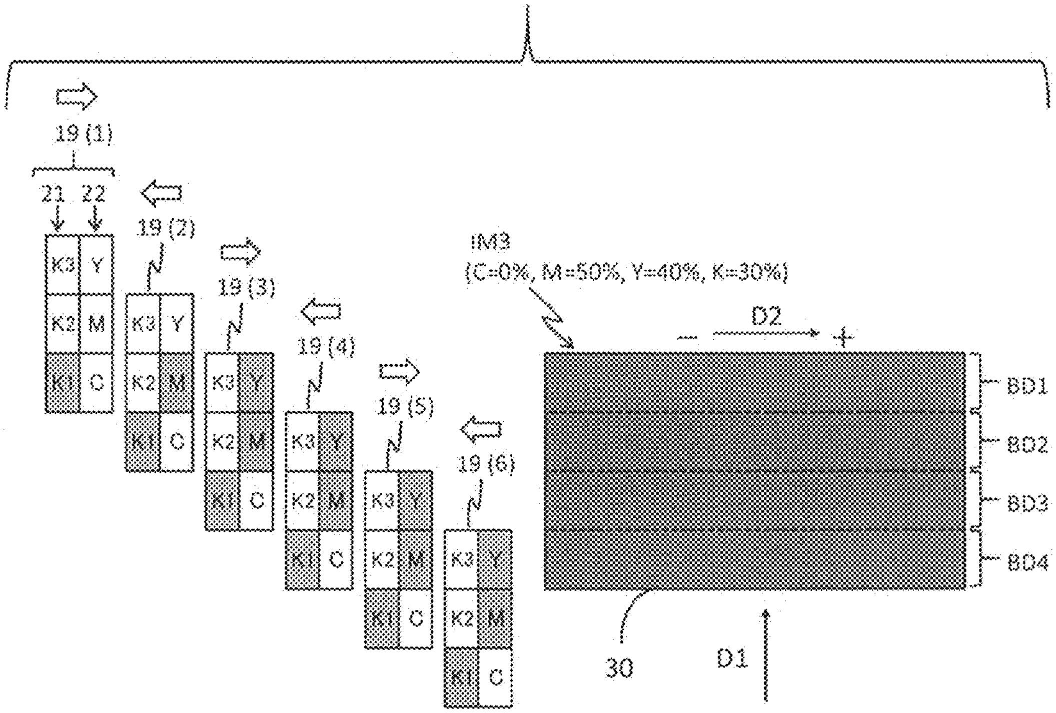
FIGS. 5A and 5B are each a diagram for explaining an example in which an image is recorded on the medium by the first recording control.

FIG. 5A is a diagram for explaining how an image IM3 is recorded on the medium 30 based on recorded data by the first recording control, and the recording head 19 and a part of the medium 30 are illustrated. The image IM3 is a uniform solid image over a plurality of band images, and discharge ratios of the CMYK inks defined by the recorded data are C=0%, M=50%, Y=40%, and K=30%, respectively. In brief, the image IM2 is a dark red image. When the image IM3 is recorded, C having a lowest discharge ratio among CMY is determined to be a first chromatic color for each band image in step S120, and in step S130 for each band image, the nozzle range 21K1 adjacent to the nozzle group 22C is determined to be an allocation destination of the K recorded data, that is, a first range.

According to FIG. 5A described above, as the result of step S140, the band region BD1 of the medium 30 is recorded by the discharge of the K ink by the nozzle range 21K1 of the forward scanning, which is first main scanning, the discharge of the M ink by the nozzle group 22M of the return scanning, which is second main scanning, and the discharge of the Y ink by the nozzle group 22Y of the forward scanning, which is third main scanning. Similarly, the band region BD2 of the medium 30 is recorded by the discharge of the K ink by the nozzle range 21K1 of the return scanning, which is the second main scanning, the discharge of the M ink by the nozzle group 22M of the forward scanning, which is the third main scanning, and the discharge of the Y ink by the nozzle group 22Y of the return scanning, which is fourth main scanning. In other words, in the example of FIG. 5A, since the discharge of the K ink in accordance with the K recorded data is performed, of the achromatic nozzle group 21, only by each nozzle 20 in the nozzle range 21K1, the color inks are discharged onto the medium 30 in order of K, M, and Y, in any of the band regions BD1, BD2, BD3, and BD4. Accordingly, color inversion unevenness caused by a different discharge order of the respective color inks does not occur between the band regions, and high-quality recording results without unevenness are obtained.

Figure 5B:
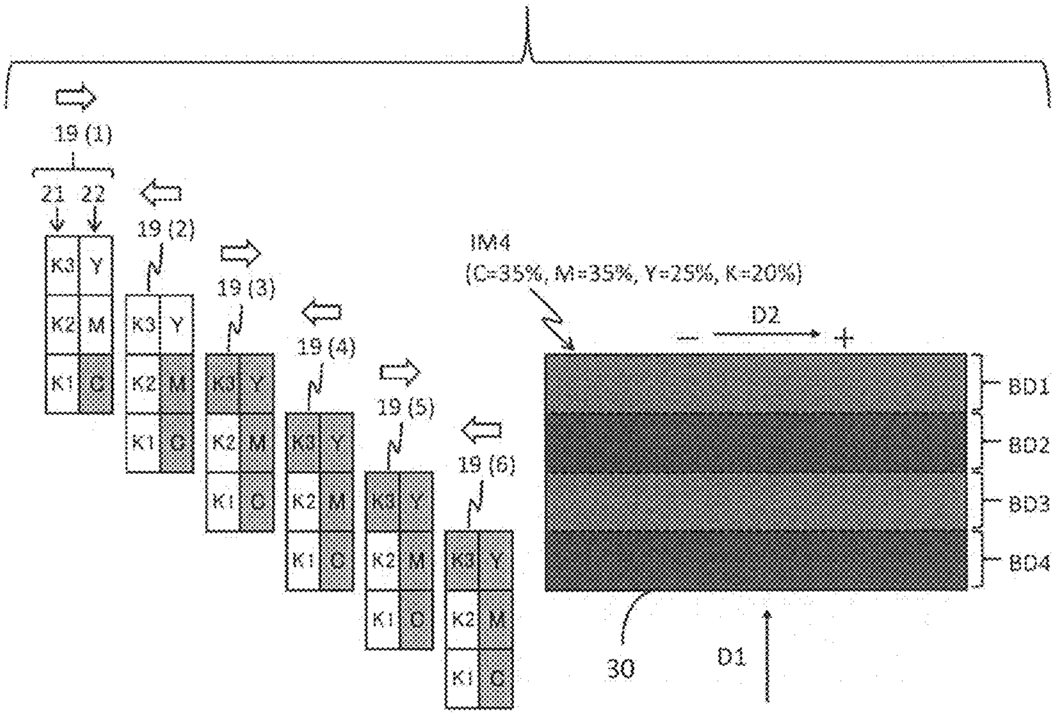

FIG. 5B is a diagram for explaining how an image IM4 is recorded on the medium 30 based on recorded data by the first recording control, and the recording head 19 and a part of the medium 30 are illustrated. The image IM4 is a uniform solid image over a plurality of band images, and discharge ratios of the CMYK inks defined by the recorded data are C=35%, M=35%, Y=25%, and K=20%, respectively. In brief, the image IM4 is a dark gray image. When the image IM4 is recorded, Y having a lowest discharge ratio among CMY is determined to be a first chromatic color for each band image in step S120, and in step S130 for each band image, the nozzle range 21K3 adjacent to the nozzle group 22Y is determined to be an allocation destination of the K recorded data, that is, a first range.

According to FIG. 5B described above, as the result of step S140, the band region BD1 of the medium 30 is recorded by the discharge of the C ink by the nozzle group 22C of the forward scanning, which is first main scanning, the discharge of the M ink by the nozzle group 22M of the return scanning, which is second main scanning, the discharge of the Y ink by the nozzle group 22Y of the forward scanning, which is third main scanning, and the discharge of the K ink by the nozzle range 21K3 of the same third main scanning. On the other hand, the band region BD2 of the medium 30 is recorded by the discharge of the C ink by the nozzle group 22C of the return scanning, which is the second main scanning, the discharge of the M ink by the nozzle group 22M of the forward scanning, which is the third main scanning, the discharge of the K ink by the nozzle range 21K3 of the return scanning, which is fourth main scanning, and the discharge of the Y ink by the nozzle group 22Y of the same fourth main scanning.

In the example of FIG. 5B, the discharge of the K ink in accordance with the K recorded data is performed, of the achromatic nozzle group 21, only by each nozzle 20 of the nozzle range 21K3. In the band regions BD1 and BD3 recorded in the forward scanning, return scanning, and forward scanning, the color inks are discharged in order of C, M, Y, and K, and in the band regions BD2 and BD4 recorded in the return scanning, forward scanning, and return scanning, the color inks are discharged in order of C, M, K, and Y. That is, the discharging order of the Y ink and the K ink is inverted between the odd-numbered band region and the even-numbered band region.

Therefore, in the example of FIG. 5B, it is difficult to completely eliminate color inversion unevenness generated between the odd-numbered band region and the even-numbered band region. However, in the image IM4, the Y ink is the first chromatic color having the lowest discharge ratio among the chromatic colors, and a degree of influence on a color tone of a recording result is less than that of the other chromatic colors. As a result, even when the discharge order of the first chromatic color and K is inverted between the band regions, a degree of inversion unevenness that is visually recognized can be reduced, as compared to when the discharge order of the chromatic color other than the first chromatic color and K is inverted between the band regions. Note that, FIG. 5B, and FIG. 7 described later comprehensibly represent that color inversion unevenness may occur between the band regions of the medium 30, but such clear unevenness is not generated actually.

5. Summary

As described above, according to the present exemplary embodiment, the recording device 10 includes the recording head 19 including a plurality of nozzle groups in which the plurality of nozzles 20 capable of discharging the liquid onto the medium 30 are disposed in the first direction, the transport unit 17 that transports the medium 30, and the control unit 11 that controls the movement of the recording head 19 and the discharge of the liquid by the recording head 19. The recording head 19 includes, as the plurality of nozzle groups, the first nozzle group in which the plurality of first nozzles that discharge the achromatic liquid are disposed, and the plurality of second nozzle groups in each of which the plurality of second nozzles that discharge the chromatic liquid are disposed, the chromatic liquids being liquids of chromatic colors that are mutually different, the plurality of second nozzle groups are disposed along the first direction, and the first nozzle group and the second nozzle group are disposed along the second direction that intersects the first direction. The control unit 11 records an image by performing the main scanning a plurality of times in the band region of the medium 30, by the forward scanning, which is the main scanning in which the recording head 19 is caused to discharge the liquid along with the forward movement along the second direction of the recording head 19, the sub scanning, which is the relative movement in the first direction between the recording head 19 and the medium 30, and the return scanning, which is the main scanning in which the recording head 19 is caused to discharge the liquid along with the return movement along the second direction of the recording head 19. In this case, the control unit 11 performs the first recording control in which, when, of the first nozzle group, the range of the first nozzles adjacent in the second direction to the second nozzle group corresponding to the first chromatic color having the lowest discharge ratio for recording the image among a plurality of the chromatic liquids is the first range, and of the first nozzle group, the range of the first nozzles adjacent in the second direction to a second nozzle group corresponding to a chromatic color other than the first chromatic color of a plurality of the chromatic colors is the second range, the discharge ratio of the achromatic liquid by the first range for recording the image is made higher than the discharge ratio of the achromatic liquid by any of the second ranges for recording the image.

According to the first recording control, the discharge ratio of the achromatic liquid by the first range for recording the image is higher than the discharge ratio of the achromatic liquid by any second range for recording the image. Accordingly, color inversion unevenness between the band regions can be suppressed.

In addition, according to the present exemplary embodiment, the control unit 11 limits the first nozzle through which the achromatic liquid is discharged for recording the image to the first range, in the first recording control. That is, the discharge ratio of the achromatic liquid by the second range is 0.

According to such a configuration, since the discharge order of inks is likely to be the same in each band region, color inversion unevenness between the band regions can be suppressed or eliminated. Furthermore, since the discharge of the achromatic liquid onto the band region is performed only by the first range, the achromatic liquid discharge is completed by performing the main scanning once for one band region. Accordingly, in the band region, it is possible to avoid image quality deterioration due to a shift of a liquid landing position between the forward scanning and the return scanning, or an error of a paper feed, particularly, deterioration of characters or ruled lines recorded using a large amount of the K ink.

Note that, depending on a result of a comparison of the discharge ratios of the chromatic colors, there may be a plurality of the achromatic colors having the lowest discharge ratio. For example, when the discharge ratios of C and M are the same and the lowest for a certain band image, it is sufficient that the allocation determination unit 12*c* determines, in step S120, either of C and M for convenience to the first chromatic color for the band image, and proceeds to step S130 or later. However, in a situation in which band images with similar color tones are continuous in an image, when one chromatic color is determined to be a first chromatic color among chromatic colors having the same and lowest discharge ratio for a band region, the same chromatic color may be determined to be a first chromatic color also in the other band regions.

According to the present exemplary embodiment, as an example, the chromatic nozzle group 21 is configured with the second nozzle groups respectively corresponding to the three or more odd chromatic colors. According to FIG. 2, the chromatic liquids are the three colors of CMY inks. In addition, the chromatic colors discharged by the chromatic nozzle group 21 may be, for example, five colors including a light cyan ink and a light magenta ink in addition to the CMY inks, or the like.

So far, the case has been mainly described in which, in the first recording control, the first nozzle for discharging the achromatic liquid for recording an image is limited to the first range, but the control unit 11 need not inhibit the discharge of the achromatic liquid by the first nozzle in the second range. In other words, in step S130, the allocation determination unit 12*c* may determine an allocation destination of the K recorded data to the first range at a position corresponding to the first chromatic color, and to the second range at a position corresponding to the chromatic color other than the first chromatic color.

For example, the first chromatic color of a band image is Y. In this case, for the band image, of the achromatic nozzle group 21, the nozzle range 21K3 adjacent to the nozzle group 22Y is the first range, and the nozzle range 21K1 and the nozzle range 21K2 are the second ranges. Thus, the allocation determination unit 12*c* determines to allocate, of the K recorded data of the band image, pixels of a predetermined ratio to the nozzle range 21K3, which is the first range, and allocate the remaining pixels other than the pixels of the predetermined ratio of the K recorded data to the nozzle range 21K1 or the nozzle range 21K2, which is the second range, and proceeds step S140. The predetermined ratio referred to here is a ratio at least more than half, but in light of the spirit of the present exemplary embodiment, the ratio may be considered not to reach 100%, but to be a ratio near 100% to some extent. For example, pixels of 90% of the K recorded data of the band image is allocated to the nozzle range 21K3, which is the first range, and all of the remaining 10% pixels are allocated to only one of the nozzle range 21K1 and the nozzle range 21K2, which are the second ranges, or half the remaining 10% pixels are allocated to each of the nozzle range 21K1 and the nozzle range 21K2.

The present exemplary embodiment discloses not only a device or system, but also disclosures of a variety of categories such as a method performed by the device or system, the program 12 that causes a processor to perform the method.

For example, in a recording method by the recording device 10, the recording device 10 including the recording head 19 including a plurality of nozzle groups in which a plurality of the nozzles 20 capable of discharging liquid onto the medium 30 are disposed in a first direction, and the transport unit 17 that transports the medium 30, the recording head 19 includes, as the plurality of nozzle groups, a first nozzle group in which a plurality of first nozzles configured to discharge an achromatic liquid are disposed, and a plurality of second nozzle groups in each of which a plurality of second nozzles configured to discharge a chromatic liquid are disposed, the chromatic liquids being liquids of chromatic colors that are mutually different, the plurality of second nozzle groups are disposed along the first direction, the first nozzle group and the second nozzle group are disposed in a second direction intersecting the first direction, the recording method includes a recording step for performing recording by controlling movement of the recording head 19 and discharge of liquid by the recording head 19. In the recording step, by forward scanning, which is main scanning in which the recording head 19 is caused to discharge the liquid along with forward movement along the second direction of the recording head 19, sub scanning, which is relative movement in the first direction between the recording head 19 and the medium 30, and return scanning, which is main scanning in which the recording head 19 is caused to discharge the liquid along with return movement along the second direction of the recording head 19, the main scanning is performed a plurality of times for a band region in the medium 30 to record an image. In this case, when, of the first nozzle group, a range of the first nozzles adjacent in the second direction to the second nozzle group corresponding to a first chromatic color having a lowest discharge ratio for recording an image among a plurality of the chromatic liquids is a first range, and of the first nozzle group, a range of the first nozzles adjacent in the second direction to a second nozzle group corresponding to a chromatic color other than the first chromatic color of a plurality of the chromatic colors is a second range, a discharge ratio of the achromatic liquid by the first range for recording the image is made higher than a discharge ratio of the achromatic liquid by any of the second ranges for recording the image.

6. Modified Examples

Modified examples included in the present exemplary embodiment will be described. Combinations of the modified examples are also naturally included in the present exemplary embodiment.

First Modified Example

When there is little difference in discharge ratios of a plurality of chromatic colors in an image, an effect of suppressing color inversion unevenness is almost unchanged regardless of whether an allocation destination of the K recorded data is a first range or a second range. That is, when a difference between the discharge ratios of the chromatic colors is small, there is little meaning of performing the first recording control. In view of such a situation, as a first modified example, the control unit 11, when a difference between discharge ratios of a plurality of chromatic liquids related to recording of an image exceeds a predetermined threshold value, may perform the first recording control, and when the difference is equal to or less than the threshold value, may perform "second recording control" in which, of a plurality of ranges constituting a first nozzle group and adjacent in a second direction to a plurality of second nozzle groups, a range upstream in a sub scanning direction in which the medium 30 is displaced relative to the recording head 19 by sub scanning is used for discharge of an achromatic liquid for recording an image. In the configuration of FIG. 2, the transport direction D1 is the sub scanning direction in which the medium 30 is displaced relative to the recording head 19.

Figure 6:
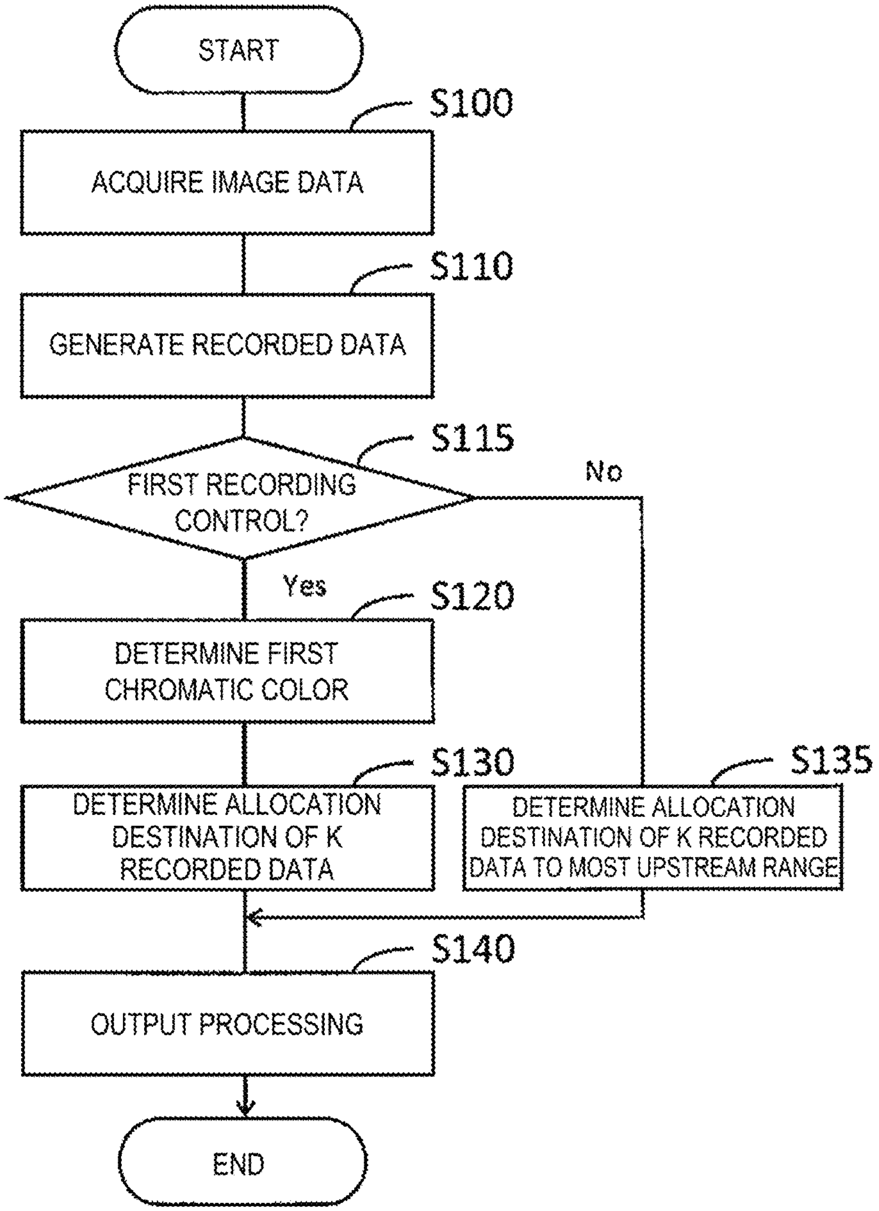
FIG. 6 is a flowchart illustrating recording control processing according to a modified example.

FIG. 6 illustrates, using a flowchart, recording control processing according to the modified example, performed by the control unit 11 in accordance with the program 12. In FIG. 6, description common to the flowchart of FIG. 3 is omitted as appropriate. After step S110, in step S115, the recording mode determination unit 12*a* determines which of the first recording control and the second recording control is to be performed, and when the first recording control is to be performed, proceeds from "Yes" determination to step S120. On the other hand, when the second recording control is to be performed, the processing proceeds to step S135 from "No" determination. As described above, step S120, S130, and subsequent step S140 are the first recording control. On the other hand, step S135 and subsequent step S140 correspond to the second recording control.

The first recording control may be referred to as a first recording mode, and the second recording control may be referred to as a second recording mode. Accordingly, it can be said that the recording mode determination unit 12*a* determines and selects the recording mode to be performed, in step S115. In step S115, the recording mode determination unit 12*a* determines whether a difference between discharge ratios of a plurality of chromatic liquids exceeds a predetermined threshold, based on recorded data. Specifically, it is determined whether a difference between a chromatic color having a highest discharge ratio and a chromatic color having a lowest discharge ratio, among the plurality of chromatic colors, exceeds the threshold value. When such a difference exceeds the threshold value, it is determined that the first recording control is to be performed, and the processing proceeds to step S120. On the other hand, when the difference is equal to or less than the threshold value, it is determined that the second recording control is to be performed, and the processing proceeds to step S135.

Setting of the threshold value used in step S115 varies, but, for example, it is assumed that the threshold value=9%, and the discharge ratios of CMYK in the image are C=40%, M=35%, Y=40%, and K=20%, respectively. In this case, since a difference of 5% between the discharge ratio of 40% of C or Y and the discharge ratio of 35% of M is equal to or less than the threshold value, "No" is determined in step S115, and the second recording control is performed. According to the above description, the determination of step S115 is also performed for each band image. That is, for each band image, recording is performed in the first recording control, or recording is performed in the second recording control. However, since the determination result in step S115 is similar for each region of a similar color tone in the image, the first recording control or the second recording control is performed in the same manner.

In step S135, the allocation determination unit 12*c* determines a range in the achromatic nozzle group 21 to be an allocation destination of the K recorded data, to a range upstream in the sub scanning direction of the plurality of nozzle ranges 21K1, 21K2, and 21K3 in the achromatic nozzle group 21, that is, according to the example of FIG. 2, to the nozzle range 21K1. Hereinafter, the nozzle range 21K1 is also referred to as a "most upstream range".

Figure 7:
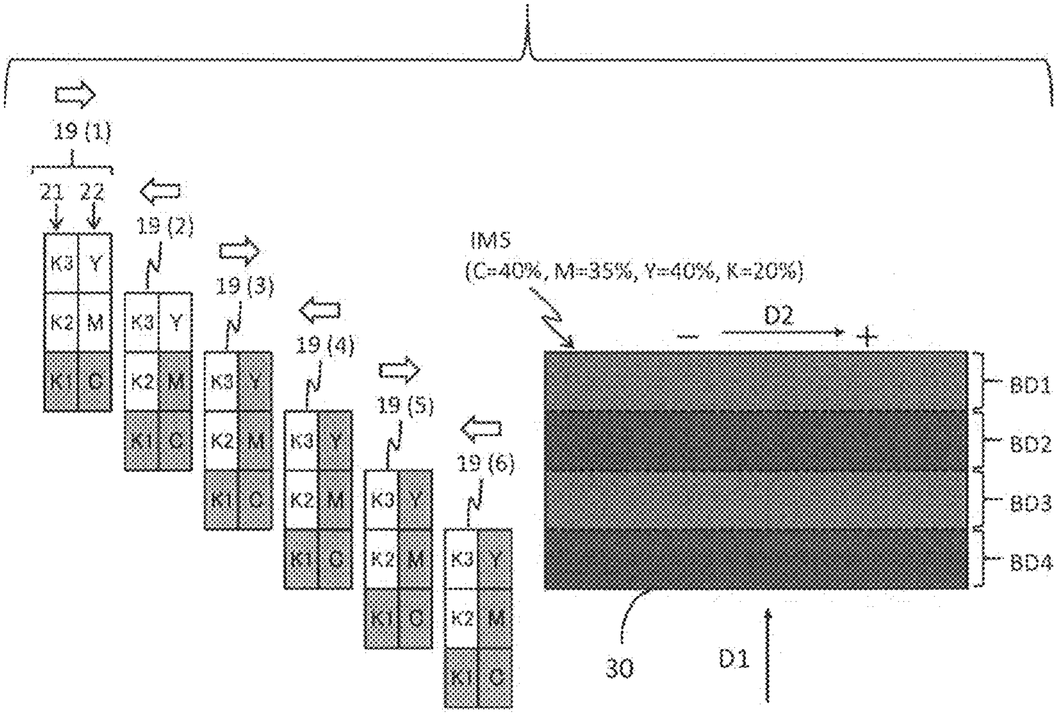
FIG. 7 is a diagram for explaining an example in which an image is recorded on the medium by second recording control.

FIG. 7 is a diagram for explaining how an image IM5 is recorded on the medium 30 based on recorded data by the second recording control, and the recording head 19 and a part of the medium 30 are illustrated. The image IM5 is a uniform solid image over a plurality of band images, and discharge ratios of the CMYK inks defined by the recorded data are C=40%, M=35%, Y=40%, and K=20%, respectively. Since in such an image IM5, a difference between the discharge ratios of the chromatic color inks is small, "No", that is, the second recording control is selected in step S115 for each band image. Thus, when the image IM5 is recorded, the nozzle range 21K1, which is a most upstream range, is determined to be the allocation destination of the K recorded data for each band image in step S135.

According to FIG. 7 described above, as the result of step S140 through step S135, the band region BD1 of the medium 30 is recorded by the discharge of the C ink by the nozzle group 22C of the forward scanning, which is first main scanning, the discharge of the K ink by the nozzle range 21K1 of the same first main scanning, the discharge of the M ink by the nozzle group 22M of the return scanning, which is second main scanning, and the discharge of the Y ink by the nozzle group 22Y of the return scanning, which is third main scanning. On the other hand, the band region BD2 of the medium 30 is recorded by the discharge of the K ink by the nozzle range 21K1 of the return scanning, which is the second main scanning, the discharge of the C ink by the nozzle group 22C of the same second main scanning, the discharge of the M ink by the nozzle group 22M of the forward scanning, which is the third main scanning, and the discharge of the Y ink by the nozzle group 22Y of the return scanning, which is fourth main scanning.

In the example of FIG. 7, the discharge of the K ink in accordance with the K recorded data is performed only by each nozzle 20 of the nozzle range 21K1. In the band regions BD1 and BD3 recorded in the forward scanning, return scanning, and forward scanning, the color inks are discharged in order of C, K, M, and Y, and in the band regions BD2 and BD4 recorded in the return scanning, forward scanning, and return scanning, the color inks are discharged in order of K, C, M, and Y. That is, the discharging order of the C ink and the K ink is inverted between the odd-numbered band region and the even-numbered band region. Therefore, in FIG. 7, it is difficult to completely eliminate the color inversion unevenness generated between the odd-numbered band region and the even-numbered band region.

However, according to the second recording control, by setting the allocation destination of the K recorded data to the most upstream range, separate merits are generated from the first recording control. That is, by setting the allocation destination of the K recorded data to the most upstream range, the K ink can be discharged in an earlier order as much as possible for each band region. As a result, it is possible to eliminate bleed-through of an achromatic color ink caused by the achromatic color ink being overlaid and discharged on a chromatic color ink, which makes it possible to stabilize the achromatic color in each band region. In particular, it is possible to prevent quality degradation of characters and ruled lines recorded using a large amount of the achromatic color ink. As described above, according to the first modified example, the first recording control is performed in a situation where the effect of the first recording control is easily obtained, and in a situation where the effect of the first recording control is difficult to obtain, the second recording control is performed to enjoy the effect by the second recording control.

The first modified examples will be supplementarily described.

Even when the difference between the discharge ratios of the plurality of chromatic liquids is equal to or less the threshold value, as far as the discharge ratio of the chromatic color having the lowest discharge ratio is 0%, the recording mode determination unit 12*a* may exceptionally determine that the first recording control is to be performed in step S115, and advance the processing to step S120. An example is a case where, in the image, the discharge ratios of CMYK are C=7%, M=5%, =0%, and K=30%, respectively. In this case, the difference of 7% between the discharge ratio of 7% of C and the discharge ratio of 0% of Y is equal to or less than the threshold value, but by allocating the K recorded data to the nozzle range 21K3 adjacent to the nozzle group 22Y corresponding to Y, the inks are discharged in order of C, M, and K in each band region, and the effect of the first recording control is properly exhibited.

Second Modified Example

It can be said that, when the medium 30 used for recording is of a type where liquid easily bleeds through, color inversion unevenness is easily noticeable, on the other hand, when the medium 30 is of a type where liquid is less likely to bleeds through, color inversion unevenness is less noticeable. Thus, as a second modified example, the control unit 11 may perform the first recording control when a type of the medium 30 is a type where liquid is more likely to bleed through than a predetermined reference, and when the type of the medium 30 is a type where liquid is less likely to bleed through than the predetermined reference, may perform the second recording control in which, of a plurality of ranges constituting a first nozzle group and adjacent in a second direction to a plurality of second nozzle groups, a range upstream in a sub scanning direction in which the medium 30 is displaced relative to the recording head 19 by sub scanning is used for discharge of an achromatic liquid for recording an image.

The second modified example will also be described with reference to the flowchart of FIG. 6.

In step S115, the recording mode determination unit 12*a* determines which of the first recording control and the second recording control is to be performed, and when the first recording control is to be performed, proceeds from "Yes" determination to step S120, and when the second recording control is to be performed, proceeds from "No" determination to step S135. The first recording control and the second recording control are as described above.

In the second modified example, in step S115, the recording mode determination unit 12*a* determines whether the type of the medium 30 to be transported by the transport unit 17 is a "first type" where the liquid is more likely to bleed through than the predetermined reference, or is a "second type" where the liquid is less likely to bleed through than the predetermined reference. Since a group of the media 30 corresponding to the first type and a group of the media 30 corresponding to the second type are predetermined, it is sufficient that the recording mode determination unit 12*a* acquires the type of the medium 30 to be transported by the transport unit 17, and determines whether the acquired type corresponds to the first type or the second type. The acquisition method of the type of the medium 30 is not particularly limited. The recording mode determination unit 12*a* acquires, for example, the type of the medium 30 by input through the operation receiving unit 14 by a user, or acquires the type of the medium 30 in accordance with a detection signal from a medium sensor (not illustrated) provided at a tray in which the medium 30 before the transport is stocked, or at a transport path of the medium 30 by the transport unit 17.

The recording mode determination unit 12*a* determines that the first recording control is to be performed when the type of the medium 30 is the first type, and advances the processing to step S120. On the other hand, when the type of the medium 30 is the second type, it is determined that the second recording control is to be performed, and the processing proceeds to step S135. As described above, according to the second modified example, the first recording control is performed in a situation where the effect of the first recording control is easily obtained, and in a situation where the effect of the first recording control is difficult to obtain, the second recording control is performed to enjoy the effect by the second recording control.

It is also possible to combine the first modified example and the second modified example. The recording mode determination unit 12*a* may determine, for example, "Yes" in step S115 when the type of the medium 30 is the first type, and the difference between the discharge ratios of the plurality of chromatic liquids exceeds the predetermined threshold based on the recorded data, or may determine "No" in step S115 when the type of the medium 30 is the second type, or the difference between the discharge ratios of the plurality of chromatic liquids is equal to or less than the threshold value.

Third Modified Example

In addition to the reciprocating movement along the main scanning direction D2, the carriage 18 may be capable of performing a reciprocating movement along a sub scanning direction that intersects the main scanning direction D2. The sub scanning direction is a first direction. So far, in sub scanning between main scanning and main scanning, the transport unit 17 feeds the medium 30 downstream, but instead, the carriage 18 may move by a distance for a band width upstream in the transport direction D1 to realize the sub scanning, between the main scanning and the main scanning. In other words, a configuration may be adopted in which, by the carriage 18 two-dimensionally moving in a plane parallel to a surface of the medium 30 being stationary, recording for a plurality of band regions is completed, the carriage 18 returns to an original position, the transport unit 17 performs transport corresponding to the plurality of band regions, and again a recording of the plurality of band regions is performed by starting the two-dimensional movement of the carriage 18.

Furthermore, in the configuration in which the carriage 18 moves two-dimensionally along the main scanning direction and the sub scanning direction relative to the medium 30 being stationary, to perform recording for a plurality of band regions, a transport direction of the medium 30 by the transport unit 17 may be a direction parallel to the main scanning direction D2, rather than the direction D1 as illustrated in FIG. 2.

What is claimed is:

1. A recording device, comprising:

a recording head including a plurality of nozzle groups in which a plurality of nozzles configured to discharge liquid onto a medium are disposed in a first direction;

a transport unit configured to transport the medium; and a control unit configured to control movement of the recording head and discharge of the liquid by the recording head, wherein the recording head includes, as the plurality of nozzle groups, a first nozzle group in which a plurality of first nozzles configured to discharge an achromatic liquid are disposed, and a plurality of second nozzle groups in each of which a plurality of second nozzles configured to discharge a chromatic liquid are disposed, the chromatic liquids being liquids of chromatic colors that are mutually different, the plurality of second nozzle groups are disposed along the first direction, the first nozzle group and the second nozzle group are disposed along a second direction intersecting the first direction, and when, by forward scanning being main scanning in which the recording head is caused to discharge the liquid along with forward movement along the second direction of the recording head, sub scanning being relative movement in the first direction between the recording head and the medium, and return scanning being main scanning in which the recording head is caused to discharge the liquid along with return movement along the second direction of the recording head, an image is recorded by performing the main scanning a plurality of times for a band region in the medium, and when, of the first nozzle group, a range of the first nozzles adjacent in the second direction to a second nozzle group, of the plurality of second nozzle groups, corresponding to a first chromatic color having a lowest discharge ratio for recording the image among a plurality of the chromatic liquids is a first range, and of the first nozzle group, a range of the first nozzles adjacent in the second direction to a second nozzle group, of the plurality of second nozzle groups, corresponding to a chromatic color other than the first chromatic color of a plurality of the chromatic colors is a second range, the control unit performs first recording control in which a discharge ratio of the achromatic liquid by the first range for recording the image is made higher than a discharge ratio of the achromatic liquid by any second range for recording the image.

2. The recording device according to claim 1, wherein the control unit:

performs the first recording control when a difference between discharge ratios of the plurality of chromatic liquids related to recording of the image exceeds a predetermined threshold value and performs, when the difference is equal to or less than the threshold value, second recording control in which, of a plurality of ranges constituting a first nozzle group and adjacent in the second direction to the plurality of second nozzle groups, a range upstream in a sub scanning direction in which the medium is displaced relative to the recording head by the sub scanning is used for discharge of the achromatic liquid for recording the image.

3. The recording device according to claim 1, wherein the control unit:

performs the first recording control when a type of the medium is a type where the liquid is more likely to bleed through than a predetermined reference and performs, when the type of the medium is a type where the liquid is less likely to bleed through than the predetermined reference, second recording control in which, of a plurality of ranges constituting the first nozzle group and adjacent in the second direction to the plurality of second nozzle groups, a range upstream in a sub scanning direction in which the medium is displaced relative to the recording head by the sub scanning is used for discharge of the achromatic liquid for recording the image.

4. The recording device according to claim 1, wherein in the first recording control, the control unit limits, of the plurality of first nozzles, first nozzles through which the achromatic liquid is discharged for recording the image to the first range.

5. A recording method by a recording device, the recording device including:

a recording head including a plurality of nozzle groups in which a plurality of nozzles configured to discharge liquid onto a medium are disposed in a first direction and a transport unit configured to transport the medium, the recording head including, as the plurality of nozzle groups, a first nozzle group in which a plurality of first nozzles configured to discharge an achromatic liquid are disposed, and a plurality of second nozzle groups in each of which a plurality of second nozzles configured to discharge a chromatic liquid are disposed, the chromatic liquids being liquids of chromatic colors that are mutually different, the plurality of second nozzle groups being disposed along the first direction, the first nozzle group and the second nozzle group being disposed along a second direction intersecting the first direction, the recording method comprising:

a recording step for performing recording by controlling movement of the recording head and discharge of the liquid by the recording head, wherein in the recording step, when, by forward scanning being main scanning in which the recording head is caused to discharge the liquid along with forward movement along the second direction of the recording head, sub scanning being relative movement in the first direction between the recording head and the medium, and return scanning being main scanning in which the recording head is caused to discharge the liquid along with return movement along the second direction of the recording head, an image is recorded by performing the main scanning a plurality of times for a band region in the medium, and when, of the first nozzle group, a range of the first nozzles adjacent in the second direction to a second nozzle group, of the plurality of second nozzle groups, corresponding to a first chromatic color having a lowest discharge ratio for recording the image among a plurality of the chromatic liquids is a first range, and of the first nozzle group, a range of the first nozzles adjacent in the second direction to a second nozzle group, of the plurality of second nozzle groups, corresponding to a chromatic color other than the first chromatic color of a plurality of the chromatic colors is a second range, a discharge ratio of the achromatic liquid by the first range for recording the image is made higher than a discharge ratio of the achromatic liquid by any second range for recording the image.

* * * * *